United States Patent Office 3,058,949
Patented Oct. 16, 1962

3,058,949
MIXTURES OF METHACRYLONITRILE COPOLYMERS WITH ALKYL ACRYLATE AND METHACRYLATE POLYMERS
Harry W. Coover, Jr., and Willis C. Wooten, Jr., Kingsport, Tenn., assignors to Eastman Kodak Company, Rochester, N.Y., a corporation of New Jersey
No Drawing. Filed July 30, 1958, Ser. No. 751,869
6 Claims. (Cl. 260—45.5)

This invention relates to resinous compositions comprising mixtures of methacrylonitrile copolymers containing at least 80% by weight of methacrylonitrile with a polymer of an acrylic or methacrylic ester containing at least 80% by weight of the ester.

This application is a continuation-in-part of our copending application Serial No. 469,034, filed November 15, 1954 (now U.S. Patent No. 2,850,478, dated Sept. 2, 1958).

Polymethacrylonitrile and copolymers thereof containing a high percentage of methacrylonitrile have properties that make them useful in the formulation of shaped articles. However, these polymers have certain other properties which are undesirable in that they tend to color and decompose when they are formed into shaped articles using the usual techniques such as injection molding. This color formation can be decreased by lowering the processing temperatures through the incorporation of a plasticizer or by the copolymerization of methacrylonitrile with another monomer such as an acrylic ester. However, these modifications result in a lowering of the heat distortion temperature of the resulting material so that shaped articles prepared therefrom do not possess the desired stability to deformation. For example, copolymers of methacrylonitrile and methyl or ethyl acrylate, in order to be readily flowable at lower processing temperatures, require an acrylate content above about 30% at which proportions and above the shaped articles prepared therefrom have too low distortion temperatures for practical commercial applications. It would, therefore, be very advantageous to provide a molding composition which would retain the high heat distortion properties of polymethacrylonitrile and at the same time have a good flow rate under processing conditions and give shaped products free from color and decomposition effects. We have now found that such an advantageous composition can be prepared by physically mixing in certain proportions a methacrylonitrile polymer containing at least 80% by weight of methacrylonitrile with a polymer of an acrylic or methacrylic alkyl ester containing at least 80% by weight of the ester.

It is, accordingly, an object of the invention to provide new resinous compositions comprising certain mixtures of methacrylonitrile polymers with acrylic or methacrylic ester polymers. Another object is to provide resinous compositions suitable for shaping purposes which have relatively high flow rates at lower processing temperatures and which are capable of giving shaped objects which are low in color and having relatively high distortion temperatures. Another object is to provide methods for preparing the said resinous compositions. Other objects will become apparent hereinafter.

In accordance with our invention, we prepare resinous compositions comprising physical mixtures of from 80 to 98% of a methacrylonitrile binary copolymer containing at least 80%, but preferably from 80 to 95%, by weight of methacrylonitrile and the remainder of a different monoethylenically unsaturated polymerizable compound, and from 20 to 2% by weight of a homopolymer of an acrylic ester represented by the general formula:

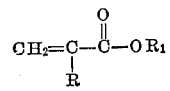

wherein R represents an atom of hydrogen or a methyl group and $R_1$ represents an alkyl group containing from 1 to 12 carbon atoms, or a binary copolymer of said ester containing at least 80% but preferably 80 to 95%, by weight of the said acrylic ester, and the remainder of a different monoethylenically unsaturated, polymerizable compound. The preferred compositions comprise the blends of from 80 to 98% by weight of a copolymer consisting of at least 80% by weight of methacrylonitrile and the remainder of α-methylstyrene, and 20 to 2% by weight of the above defined acrylic ester homopolymers.

The mixtures or blends of the invention can be prepared by any of several methods. For example, the polymeric components can be dissolved in one or more common solvents such as N,N-dimethyl formamide, N,N-dimethyl acetamide, gamma-butyrolactone, etc. In this procedure the components can be mixed together before addition to the solvents or they can be dissolved separately in the solvent and their separate solutions then mixed together, the mixtures in either case being precipitated into a nonsolvent therefor by known procedures. They can also be polymerized separately to aqueous emulsion form, the emulsions then mixed together and coagulated by means of a saturated salt solution, followed by filtering, washing and drying the coagulated mixed polymeric product. They can also be prepared by thoroughly mixing the polymeric components on hot rolls and the mixture obtained them being granulated. While the mixtures of the invention do not require a plasticizer, it is sometimes beneficial to incorporate small amounts of plasticizers such as normal butyl sulfone. By doing so, it always requires less of the plasticizer to produce a given processing temperature than is required for the methacrylonitrile polymer mixture containing no plasticizer. Also, small amounts of stabilizers such as hydroquinone bisglycidyl ether, epichlorohydrin or hypophosphorous acid can advantageously be added to the above mixtures.

Suitable binary copolymers of methacrylonitrile for practicing our invention include copolymers containing at least 80% by weight of methacrylonitrile and up to 20% by weight of at least one other unsaturated compound such as the α,β-monoethylenically unsaturated fatty acid alkyl esters represented by acrylic, methacrylic, fumaric, maleic, itaconic and citraconic acid alkyl esters wherein the alkyl group contains from 1 to 12 carbon atoms, e.g. methyl acrylate, ethyl acrylate, propyl acrylate, butyl acrylate, lauryl acrylate, butyl methacrylate, dimethyl fumarate, diethyl fumarate, dipropyl fumarate, diamyl fumarate, didodecyl fumarate and corresponding dialkyl malesters, dimethyl itaconate, dimethyl citraconate, etc., a vinyl ester of a saturated monobasic fatty acid containing 2–4 carbon atoms e.g. vinyl acetate, vinyl propionate and the vinyl butyrates, a vinyl aromatic hydrocarbon compound such as styrene, α-methylstyrene, a vinylnaphthalene, etc., a vinyl halide such as vinyl chloride, vinyl fluoride, etc., a vinylidene halide such as vinylidene chloride, vinylidene chloride-bromide, etc. Suitable alkyl acrylate and alkyl methacrylate polymers for blending with the methacrylonitrile copolymers, the homopolymers, as well as the copolymers containing at least 80% by weight of the alkyl acrylate or alkyl methacrylate and up to 20% by weight of a different unsaturated compound such as diethyl fumarate, dipropyl fumarate, diamyl fumarate, didodecyl fumarate and corresponding dialkyl malesters, a vinyl aromatic hydrocarbon, a vinyl halide, a vinylidene halide, a dialkyl fumarate or maleate, above defined or methacrylonitrile.

The following examples will serve to illustrate further the new resinous compositions of our invention and the manner of their preparation.

EXAMPLE 1

In a 3-necked flask equipped with a stirrer, a thermometer and a nitrogen inlet, there were placed 500 g. of freshly distilled ethyl acrylate, 3000 g. of distilled water, 10 g. of sodium lauryl sulfate, 2.5 g. of potassium persulfate and 2.5 g. of tertiary dodecyl mercaptan. The mixture was stirred under an atmosphere of nitrogen at 50° C. for 24 hours to form an emulsion of polyethyl acrylate. Part of the emulsion was broken by the addition thereto of a saturated aqueous sodium chloride solution. The resulting precipitated rubbery polymer was separated, washed with water, and dried at 40° C.

EXAMPLE 2

A mixture of 180 g. of methacrylonitrile, 20 g. of α-methylstyrene in water, containing appropriate amounts of sodium lauryl sulfate, potassium persulfate and tertiary dodecyl mercaptan was heated under nitrogen, with stirring, at 50° C. for 48 hours in a 3-necked flask equipped with a mechanical stirrer, a thermometer and a nitrogen inlet tube. An emulsion of a copolymer consisting of approximately 90% by weight of methacrylonitrile and 10% by weight of α-methylstyrene was obtained.

In place of the α-methylstyrene in the above example, there can be substituted a like amount of styrene to give a copolymer of methacrylonitrile and styrene, or a like amount of ethyl acrylate to give a copolymer of methacrylonitrile and ethyl acrylate, or a like amount of methyl methacrylate to give a copolymer of methacrylonitrile and methyl methacrylate, or a like amount of vinylidene chloride to give a copolymer of methacrylonitrile and vinylidene chloride, etc.

EXAMPLE 3

20 g. of polyethyl acrylate prepared and isolated according to Example 1, 180 g. of the copolymer prepared and isolated according to Example 4, 20 g. of normal butyl sulfone and 3 g. of hydroquinone bisglycidyl ether were mixed on a hot mill roll or in a heated screw extruder to give an intimately mixed composition, wherein the proportions of polymers were 10% by weight of polyethyl acrylate and 90% by weight of the copolymer. The mixture was readily moldable into shaped objects such as buttons at 200° C. without noticeable color formation.

In place of the copolymer in the above example, there can be substituted a like amount of any other of the binary copolymers described in Example 2, to give mixtures containing, for example, 90% by weight of a 90:10 copolymer of methacrylonitrile/ethyl acrylate and 10% by weight of polyethyl acrylate, or 90% by weight of a 90:10 copolymer of methacrylonitrile/vinylidene chloride, etc. and 10% by weight of polyethyl acrylate.

Additional examples illustrating the compositions of the invention and properties thereof are described below.

EXAMPLE 4

In a three-necked flask equipped with a stirrer, thermometer, and nitrogen inlet was placed 800 g. of methacrylonitrile, 200 g. of α-methylstyrene, 10 g. of sodium lauryl sulfate, 10 g. of t-dodecyl mercaptan, and 10 g. potassium persulfate. The mixture was stirred at 50° C. for 48 hours. The resulting suspension was completely coagulated with concentrated aqueous sodium chloride. The polymer was collected on a filter, and washed with distilled water until salt-free. The polymer was dried at 50° C. in a circulating air oven for 48 hours. The dried polymer which weighed 950 g. was a fine, white powder.

EXAMPLES 5–13

In a manner similar to Example 4 copolymers were made and isolated from the following monomer mixtures.

| Example No. | Methacrylonitrile, g. | Acrylonitrile, g. | Other Monomers |
| --- | --- | --- | --- |
| 5 | | 800 | 200 g. α-Methylstyrene. |
| 6 | 800 | | 200 g. Butyl methacrylate. |
| 7 | | 800 | Do. |
| 8 | 800 | | 200 g. Vinylidene chloride. |
| 9 | | 800 | Do. |
| 10 | 800 | | 200 g. Methyl acrylate. |
| 11 | 800 | | 200 g. Dimethyl itaconate. |
| 12 | 800 | | 200 g. Styrene. |
| 13 | 800 | | 200 g. Dimethyl fumerate. |

In all cases the polymer was obtained as a fine powder. The yields varied slightly but in all cases over 950 g. of polymer was obtained.

EXAMPLES 14–37

The polymers prepared in Examples 4 and 5–13 were compounded on a hot mill roll with different acrylic rubbers and injection molded. The results of these experiments are listed in the following table. In each case, 10% dibutyl sulfone and 3% hydroquinone, based on total weight of polymer, was added during rolling to decrease color formation. In all of the examples 100 g. of the nitrile polymer was used. The amount and kind of acrylic rubber is indicated in the table. The polybutyl methylacrylate, polyhexyl methacrylate, polybutyl acrylate, and polymethyl acrylate were made in a manner similar to Example 1. The material after compounding on the roll was then injection molded in a small Watson-Stillman machine to form ⅛″ x 3″ x ½″ bars. All of the polymer blends made from methacrylonitrile yielded molded specimens that softened in the range of 100 to 110° C. and that were hard and tough.

In general, the molded pieces containing the rubbery component were tougher than those that did not contain the rubbery component. The presence of the rubbery component had no effect on softening point and little effect on hardness. The most noticeable effect of the addition of the rubbery component was the improved moldability. This effect is indicated in the table.

ester can be prepared, for example, preferably mixtures containing 80%, 85%, 90%, 95%, 98% etc. of the methacrylonitrile copolymer, the remainder of the mixture in each case being a polyacrylate such as polyethyl acrylate, a polybutyl acrylate, etc. or a corresponding polymethacrylate. These mixtures, as well as those containing the copolymers coming within the invention, all have similarly good flow rates and the articles produced therefrom are characterized by absence of color and Table

| Example | Amount, g. | Nitrile Polymer Composition, percent by wt. | Acrylic Rubber | | Molding Temperature, °F. | Moldability Rating | |
|---|---|---|---|---|---|---|---|
| | | | Amount, g. | Composition | | Flow | Color |
| 14 | 100 | 80/20 MAN-α-methylstyrene | 20 | MA | 450 | 1 | 1 |
| 15 | 100 | do | 10 | MA | 450 | 2 | 1 |
| 16 | 100 | do | 0 | | 450 | 4 | 1 |
| 17 | 100 | do | 0 | | 500 | 2 | 3 |
| 18 | 100 | do | 20 | BMA | 450 | 1 | 1 |
| 19 | 100 | do | 10 | BMA | 450 | 2 | 1 |
| 20 | 100 | 80/20 AN-α-methylstyrene | 20 | BMA | 450 | 5 | 3 |
| 21 | 100 | do | 20 | BMA | 550 | 5 | 4 |
| 22 | 100 | do | 20 | MA | 450 | 5 | 3 |
| 23 | 100 | 80/20 MAN-butyl methacrylate | 20 | MA | 450 | 1 | 2 |
| 24 | 100 | 80/20 AN-butyl methacrylate | 20 | MA | 450 | 5 | 3 |
| 25 | 100 | do | 20 | MA | 550 | 5 | 4 |
| 26 | 100 | 80/20 MAN-vinylidene chloride | 20 | MA | 450 | 1 | 2 |
| 27 | 100 | 80/20 AN-vinylidene chloride | 20 | MA | 450 | 5 | 3 |
| 28 | 100 | 80/20 MAN-methyl acrylate | 20 | MA | 450 | 1 | 1 |
| 29 | 100 | do | 20 | MA | 425 | 2 | 1 |
| 30 | 100 | do | 20 | BA | 425 | 1 | 1 |
| 31 | 100 | do | 20 | HMA | 425 | 1 | 1 |
| 32 | 100 | do | 10 | HMA | 450 | 2 | 1 |
| 33 | 100 | 80/20 MAN-dimethyl itaconate | 20 | HMA | 450 | 1 | 2 |
| 34 | 100 | 80/20 MAN-styrene | 20 | BA | 450 | 1 | 1 |
| 35 | 100 | do | 20 | BA | 450 | 2 | 1 |
| 36 | 100 | 80/20 MAN-dimethyl fumarate | 10 | BA | 450 | 1 | 1 |
| 37 | 100 | do | 0 | | 450 | 4 | 1 |

LEGEND FOR ABOVE TABLE

Moldability Rating-Flow:
1. Excellent molding qualities, flowed into mold readily, and filled completely.
2. Good molding qualities, flowed readily, filled mold in most cases.
3. Fair molding qualities, the polymer did not flow readily, and would often not fill mold.
4. Poor molding qualities, flowed with great difficulty, mold could not be filled.
5. Would not mold at any temperature below the decomposition temperature.

Moldability Rating-Color:
1. No additional color formed during molding.
2. Slight amount of color formed during molding.
3. Large amount of color formed during molding.
4. Material turns black, and a considerable amount of decomposition takes place Abbreviations:
MAN—represents methacrylonitrile homopolymer.
AN—represents acrylonitrile homopolymer.
MA—represents methyl acrylate homopolymer.
BMA—represents butyl methacrylate homopolymer.
HMA—represents hexyl methacrylate homopolymer.
BA—represents butyl acrylate homopolymer.

It will be noted from the above table that the nitrile polymers prepared with methacrylonitrile gave mixtures or blends with the specified alkyl acrylate and methacrylate homopolymers that showed marked superiority as to flow and color over those wherein acrylonitrile replaced the methacrylonitrile. For example, the mixtures produced according to the invention as represented by Examples 14, 15, 18, 19, 23, 26 and 28–36 show flow rates of from 1–2 and color ratings of from 1–2, but predominantly the best value 1, whereas the mixtures produced with acrylonitrile polymers as represented by Examples 20–21, 24, 25 and 27 show flow rates in each case of 5, which indicates that decomposition takes place before any flow, and color ratings of 3–4, i.e. the compositions become highly colored when molding is attempted. Even the molding tests on the methacrylonitrile copolymers alone (without any blending with the acrylic ester homopolymers) as represented by Examples 16, 17 and 37 show superiority over the acrylonitrile copolymer blends.

By proceeding as set forth in the examples illustrating the invention, any other physical mixtures coming within the specified ranges of from 80 to 98% by weight of methacrylonitrile copolymer containing at least 80% by weight of methacrylonitrile and from 20 to 2% by weight of an acrylic or methacrylic alkyl ester polymer containing at least 80% by weight of the polymeric decomposition products, and show relatively high distortion temperatures.

Although the mixed compositions of the invention have been specifically described in connection with their use for molding of three dimensional objects and articles, these compositions are also adaptable to the preparation of sheet materials which may or may not contain, as desired, suitable fillers, plasticizers, dyes, stabilizers, and the like added materials. For sheet making purposes, the mixed compositions can be coated from their solutions in suitable organic solvents onto smooth surfaces of metal, glass, etc., or extruded from their hot melts. Such sheet materials are characterized by dimensional stability due to their relatively high heat distortion temperatures and are eminently suitable for use as photographic film supports.

What we claim is:
1. A resinous composition comprising a mixture of (1) from 80 to 98% by weight of a copolymer consisting of from 80 to 95% by weight of methacrylonitrile and 20 to 5% by weight of a compound selected from the group consisting of an alkyl acrylate, an alkyl methacrylate, a dialkyl fumarate, a dialkyl maleate, a dialkyl itaconate and a dialkyl citraconate wherein in each instance the said alkyl group contains from 1 to 12 carbon atoms, styrene, α-methylstyrene, vinyl naphthalene, vinyl chloride, vinyl fluoride and vinylidene chloride, and (2) from 20 to 2% by weight of a homopolymer of an acrylic ester monomer represented by the following general formula:

$$CH_2=C-\overset{O}{\underset{R}{\overset{\|}{C}}}-OR_1$$

wherein R represents a member selected from the group consisting of an atom of hydrogen and a methyl group and $R_1$ represent an alkyl group containing from 1 to 12 carbon atoms.

2. A resinous composition comprising a mixture of (1) from 80 to 98% by weight of a copolymer consisting of from 80 to 95% by weight of methacrylonitrile and 20 to 5% by weight of α-methylstyrene and (2) from 20 to 2% by weight of polymethyl acrylate.

3. A resinous composition comprising a mixture of (1) from 80 to 98% by weight of a copolymer consisting of from 80 to 95% by weight of methacrylonitrile and 20 to 5% by weight of butyl methacrylate and (2) from 20 to 2% by weight of polymethyl acrylate.

4. A resinous composition comprising a mixture of (1) from 80 to 98% by weight of a copolymer consisting of from 80 to 95% by weight of methacrylonitrile and 20 to 5% by weight of vinylidene chloride and (2) from 20 to 2% by weight of polymethyl acrylate.

5. A resinous composition comprising a mixture of (1) from 80 to 98% by weight of a copolymer consisting of from 80 to 95% by weight of methacrylonitrile and 20 to 5% by weight of methyl acrylate and (2) from 20 to 2% by weight of polyhexyl methacrylate.

6. A resinous composition comprising a mixture of (1) from 80 to 98% by weight of a copolymer consisting of from 80 to 95% by weight of methacrylonitrile and 20 to 5% by weight of dimethyl fumarate and (2) from 20 to 2% by weight of polybutyl acrylate.

References Cited in the file of this patent

UNITED STATES PATENTS

| | | |
|---|---|---|
| 2,652,391 | Schulken et al. | Sept. 15, 1953 |
| 2,666,025 | Nozaki | Jan. 12, 1954 |
| 2,666,042 | Nozaki | Jan. 12, 1954 |
| 2,835,647 | Schulken et al. | May 20, 1958 |
| 2,850,478 | Coover et al. | Sept. 2, 1958 |
| 2,926,160 | Kern | Feb. 23, 1960 |